Nov. 10, 1964  W. KOCH  3,156,198
METHOD OF PROCESSING SEWAGE SLUDGE
Filed Jan. 26, 1961
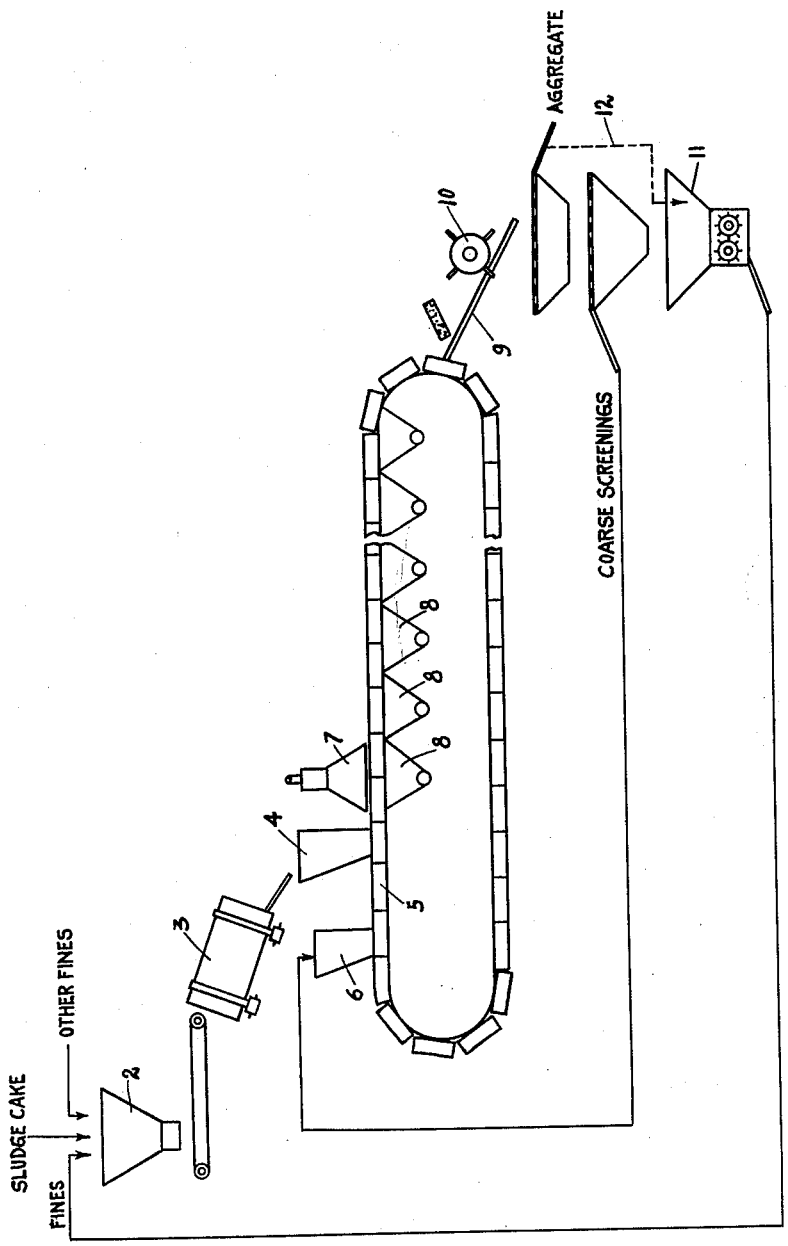
INVENTOR.
WALTER KOCH.
BY
Christy, Parmelee & Strickland
ATTORNEYS.

United States Patent Office 3,156,198
Patented Nov. 10, 1964

3,156,198
METHOD OF PROCESSING SEWAGE SLUDGE
Walter Koch, Offenbach (Main), Germany, assignor to Dravo Corporation, Pittsburgh, Pa., a corporation of Pennsylvania
Filed Jan. 26, 1961, Ser. No. 85,086
7 Claims. (Cl. 110—7)

This invention relates to the disposal of sewage, and is for a process of converting sewage sludge into a useable lightweight aggregate.

The disposition of sewage resulting from the operation of sewage collecting plants presents a considerable economic problem. In some operations the sewage is digested, after which it is filtered or centrifuged to remove the bulk of the water and is thereafter disposed of as fertilizer, or simply dumped at some location as groundfill. In other cases the sewage is run into settling tanks to mechanically clarify the water, and the raw sewage that is collected is dewatered and disposition of the sludge or filter cake must then be made in some sanitary fashion. Most frequently it is burned in a specially constructed incinerator, producing a powder-like ash, the disposition of which still presents a problem. The volume of material in such case is less, but the handling of the ash still presents a problem.

In either process, where the sewage is digested, or where it is raw and simply dewatered, there is a mass or residue or filter cake that is solid and coherent in nature, but which nevertheless has a total water content which usually is between 72% and 78% of the total weight. While a considerable amount of the sludge is combustible organic material, there is an appreciable inorganic content.

According to the present invention there is mixed with the dewatered sludge or sludge cake finely-divided dry material, a large part or all of which may be derived from sludge previously processed in the same manner, in a sufficient amount to materially lower the water content of the resulting mix, producing a friable mass which may be termed a pre-dried mix. The mix is then processed to form it into small pellets or lumps or bodies which can be deposited in a layer to form an air-permeable bed. This bed is ignited, and air is forced through it. The combustible material will burn with sufficient heat to form a sinter which may subsequently be broken or crushed to provide light-weight aggregate of low bulk density for incorporation into a cement or other bonding material. Fines produced from the crushing or breaking of the sinter are mixed with incoming sludge to provide the dry material that is mixed into the sludge. In addition, finely-divided dry waste materials that may or may not have some fuel value, such as flue dust, fly ash, finely-divided coal mine waste, or waste from coal washing, and similar finely-divided dry material, or mineral substances having no fuel value, or containing burnable material in amounts too small to be used satisfactorily as fuel may be used for the mix-drying or pre-drying of the sludge.

Preferably the burning and sintering is effected on a sintering apparatus of the kind broadly referred to as a Dwight-Lloyd sintering band where the pellets of sludge and dry material are discharged into a succession of moving trays or pallets forming an air-pervious bed several inches deep in each pallet. Typically each pallet in turn travels under an igniting hood where an oxidizing flame is pulled by suction through the bed to ignite the surface of the material, and the pallets then progress over a succession of wind boxes by which atmospheric or preheated air is drawn down through the bed, causing combustion to continue downwardly through the bed from the top. The forced draft or suction through the bed causes organic material to burn with sufficient intensity to sinter the mass to a strongly fused or bonded cake which, because of the burning away of the organic material, is porous and of low bulk density. The sinter cake can then be broken down into useable aggregate in compositions where light-weight aggregate of moderate strength is desired.

The sintering apparatus per se forms no part of the present invention, and various different structures are available where heat of combustion or heat from the cooling of the burned product is used to heat the combustion air, or to dry or preheat the bed before the charge is ignited. The use of such modified sintering apparatus may be employed in the present invention.

The accompanying drawing is a schematic view illustrating the process.

The sewage sludge, either raw or treated, is dewatered in the usual manner, as by centrifuging or filtering. It is delivered to a mixer where it is pre-dried by being mixed with a sufficient amount of finely-divided solid material to reduce the water content of the mix to a level where the mix can be burned. As above indicated, this fine dry material may be comprised entirely, or largely, of fines resulting from sewage sludge which has been previously processed in the same manner. Some of the dry fine material may be other waste substances largely of a mineral or inorganic character, as for example flue dust, fly ash, finely-divided waste resulting from the sink and float washing of coal, finely-divided coal mine waste which may or may not contain some combustible material, but which in any event is so low in fuel content as to make it useless as a normal fuel. Such other mineral or inorganic material enriches the mineral content of the mix, or may desirably strengthen the resulting sinter. The total amount of finely-divided dry material that is mixed with the sludge will vary somewhat with the character of the material, and with the extent to which the sludge has been dewatered before it is processed. As above indicated, usually the dewatered sludge contains between 72 and 78% total water. Typically sufficient dry material of a finely-divided nature may be added to reduce the moisture content to somewhere around 25%. This may result in using as much as two parts of dry fines to one part of sludge, but as hereinbefore indicated, this will vary, and the proper amount to be added must be determined in each instance.

The fines and the sludge are mixed together in the mixer of any suitable type, as for example a pug mill, and the sludge cake is reduced to a friable state and disintegrated. The mixture is then processed to convert it into small lumps or pellets, apparatus well known for this purpose being available. In the diagram, the material is transported from the mixer to a balling drum or pelletizing drum 3, from which it is discharged as small, generally spherical balls of around ⅛ inch in diameter. If desired, some of the dry material can be incorporated into the mix in the balling drum 3.

The small lumps or pellets or bodies of the mix are then discharged into hopper 4 over a sintering band 5 of the type generally known as a Dwight-Lloyd sintering band wherein a continuous succession of pellets move horizontally along the top reach of a continuous conveying apparatus, first beneath a hopper 6 where a thin layer bed or grate layer of material is deposited on the pallets. Next they move under the hopper 4 where the pellets are deposited to a depth of several inches. Because of the spherical or lump-like nature of the material, the bed deposited on the sintering band from the hopper 4 will be porous and air-pervious. Beyond the hopper 4 there is an ignition hood 7, and below the ignition hood 7 and extending along the band in the direction of travel of the pallets are a succession of wind boxes connected with a suction fan system, these boxes being designated 8. As the pallets pass under the ignition hood 7 the layer of material on the top surface of the bed is ignited and the products of combustion are drawn down through the bed to progressively dry the underlying material. As the material is carried along over successive wind boxes, combustion progresses downwardly through the bed. There is sufficient burnable organic material in this sludge that, when it has been pre-dried by the addition of finely-divided material in the manner above described, it will sustain combustion after the charge has been ignited, and sufficient heat will be generated to fuse and sinter the unburned residue and form a porous low bulk density sinter.

At the discharge end of the sintering band the pallets are inverted to travel along a lower reach of the apparatus and be returned again to the starting position while the sinter cake which has been formed falls out of the pallets usually onto a grate-like structure 9 down which it moves into engagement with a sinter breaker 10 which breaks it into irregular lumps or pieces. These pieces may be reduced, either by the sinter breaker or subsequently, into fragments of the desired size to be used for aggregate. In the process of breaking down the sinter cake to useable sized fragments, some lumps or fragments which are below the selected size will be formed, and these may be screened out and discharged into the hopper 6 as indicated in the diagram to form the grate layer on the sintering band. Other material will be reduced to fines and these fines will be carried over to the mixer 2 to be combined with incoming sludge. If the quantity of fines so produced is not sufficient to adequately dry the mix and no other source of fine dry material is available, some of the sintered products may be ground to the desired size to augment the naturally resulting supplying of fines.

The fines which are returned to the mixer will range from 0 up to 2 mm., and all of the material used for return stock may be passed through a grinder 11 to reduce it to a maximum size of about 0.5 mm. The dotted line 12 indicates the transfer of some finished material to the grinder to make return stock. Granular material ranging between 2 to 8 mm. will be used as the grate or bed layer in the hopper 6, while the aggregate for use as a commercial product may be of any selected size, for example in a range between 8 and 15 mm.

From the foregoing it will be seen that my invention provides a method of converting sewage sludge into a useable light-weight or low bulk density aggregate adaptable for use in the building industry or elsewhere where a moderate strength porous aggregate is desired. The process is effected at low cost, since the organic material in the sewage sludge itself provides sufficient heat for producing the sinter. It also provides a method where other waste materials having no fuel value, or of such low fuel value as to be unuseable, can be advantageously employed for pre-drying, and be combined into the sinter.

While for purposes of illustration I have shown and specifically described one apparatus for performing my invention, it will be understood that this is by way of illustration and that various changes and modifications may be made therein.

I claim:

1. The method of converting dewatered sewage sludge to light-weight aggregate which comprises mixing dry finely-divided previously processed sludge with sludge to be processed to produce a friable mix, forming the mix into individual small bodies, forming a layer of these small bodies, igniting the layer and forcing oxidizing gas therethrough to burn out combustible matter and fuse unburned residue into a sinter.

2. The method of converting dewatered sewage sludge to light-weight aggregate which comprises mixing dry finely-divided previously processed sludge with sludge to be processed to produce a friable mix, forming the mix into individual small bodies, forming a layer of these small bodies, igniting the layer and forcing oxidizing gas therethrough to burn out combustible matter and fuse unburned residue into a sinter, breaking some of the sinter up into useable aggregate and forming some of the sinter into fines, and using the fines as return stock for mixing with the dewatered sludge.

3. The method of converting dewatered sewage sludge to light-weight aggregate as defined in claim 2 where additional inorganic finely-divided fine material is also mixed with the dewatered sewage to enhance its content of noncombustible material.

4. The method of converting dewatered sewage sludge to light-weight aggregate which comprises mixing and pre-drying the sludge with dry finely-divided product previously processed to form a pre-dried friable mix, forming the mix into small pellet-like bodies, depositing these bodies on a sintering band to form an air-pervious bed, conveying the bed through an ignition zone where the layer is ignited, and then forcing air through the bed to complete the burning of combustibles and fuse unburned residue into a sintered mass, breaking the sintered mass into useable aggregate and finely-divided return stock to be mixed with other sludge to be processed.

5. The method of converting dewatered sewage sludge to light-weight aggregate as defined in claim 4 in which the dewatered sludge contains from about 72 to 78% by weight of water and dry finely-divided material is mixed therewith in the general ratio of two parts of dry material to one of dewatered sludge.

6. The method of converting dewatered sewage sludge to light-weight aggregate as defined in claim 5 in which the small pellets have a diameter of the order of one-eighth of an inch.

7. The method of processing dewatered sewage sludge which comprises pre-drying the sludge by admixing therewith finely-divided dry mineral material and dry finely-divided product from sludge previously so treated to form a friable mixture, forming the friable mixture into small separate bodies, forming an air-pervious bed of such bodies on a horizontally-moving sintering band, igniting the top layer of the moving bed, forcing air through the bed after it is ignited to continue the combustion of burnable material in the mix through the depth of the bed and converting unburned residue into a sintered mass, breaking the sintered mass into useable aggregate and fines, and mixing the fines with other sludge to be processed.

References Cited in the file of this patent

UNITED STATES PATENTS

| | | |
|---|---|---|
| 1,283,483 | Dwight et al. | Nov. 5, 1918 |
| 2,026,969 | Flynn | Jan. 7, 1936 |
| 2,066,418 | O'Mara | Jan. 5, 1937 |
| 2,119,615 | Wendeborn | June 7, 1938 |